US012761632B2

(12) United States Patent
Narayanan et al.

(10) Patent No.: US 12,761,632 B2
(45) Date of Patent: Oct. 13, 2026

(54) SYSTEMS AND METHODS FOR GENERATING A KNOWLEDGE GRAPH BASED ON INDUSTRIAL DATA

(71) Applicant: Rockwell Automation Technologies, Inc., Mayfield Heights, OH (US)

(72) Inventors: Sudheeshechandran Narayanan, Downtown (AE); Ganesh H. Iyer, Bangalore (IN); Rupak D. Das, Bangalore (IN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 349 days.

(21) Appl. No.: 18/407,137

(22) Filed: Jan. 8, 2024

(65) Prior Publication Data

US 2024/0231322 A1 Jul. 11, 2024

Related U.S. Application Data

(60) Provisional application No. 63/479,361, filed on Jan. 11, 2023.

(51) Int. Cl.
*G05B 19/4155* (2006.01)

(52) U.S. Cl.
CPC .................... *G05B 19/4155* (2013.01); *G05B 2219/31368* (2013.01)

(58) Field of Classification Search
CPC ...... G05B 19/4155; G05B 2219/31368; G05B 2219/31472; G05B 19/4184; G05B 23/0229; G05B 23/0272; G06N 5/022; G06N 3/0475; G06N 20/00; G06N 5/02
See application file for complete search history.

(56) References Cited

U.S. PATENT DOCUMENTS

2023/0196242 A1* 6/2023 Kumar ............... G05B 23/0229 705/7.27

OTHER PUBLICATIONS

Yin.pdf (Zhiqiang Yin, Lin Shi, Yang Yuan, Xinxin Tan and Shoukun Xu, A Study on a Knowledge Graph Construction Method of Safety Reports for Process Industries, Jan. 3, 2023, MDPI, pp. 1-22) (Year: 2023).*
EP Search Report for EP Application No. 24151405.8, Mailed Jun. 7, 2024, 10 pages.
Yin et al., "A Study on a Knowledge Graph Construction Method of Safety Reports for Process Industries," Processes, 2023, https://doi.org/10.3390/pr11010146 , 22 pages.

* cited by examiner

*Primary Examiner* — Bao Long T Nguyen
(74) *Attorney, Agent, or Firm* — Fletcher Yoder, P.C.

(57) ABSTRACT

A system includes processing circuitry and a memory, accessible by the processing circuitry, the memory storing instructions that, when executed by the processing circuitry, cause the processing circuitry to perform operations including receiving industrial data collected from an industrial automation system during performance of an industrial automation process and applying an asset model to the industrial data to contextualize the industrial data. When executed, the instructions also cause the processing circuitry to perform operations including determining event data based on the industrial data, generating a knowledge graph based on the industrial data and the event data, identifying an event based on the event data, and providing for display via a graphical user interface (GUI), one or more remedies for the event based on the knowledge graph.

20 Claims, 5 Drawing Sheets

172

| TIME STAMP (174) | SEVERITY (176) | HIERARCHY (178) | ALARM NAME (180) | ALARM MESSAGE (182) | STATUS (184) | REMEDIES (102) |
|---|---|---|---|---|---|---|
| 2023-10-19 (17:45:30) | MODERATE | ENTITY>LOCATION >COMPONENT | LOW PRESSURE | EXCESS PRESSURE | OPEN | (1) |
| 2023-10-19 (17:42:30) | CRITICAL | ENTITY>LOCATION >COMPONENT | MOTOR DOES NOT START | ACTIVE POWER (96)<100 | OPEN | (1) |
| 2023-10-19 (10:29:36) | LOW | ENTITY>LOCATION >COMPONENT | LOW EXHAUST TEMPERATURE | FLOW METER TEMPERATURE<20 | OPEN | (1) (2) (3) |

170

SYSTEMS AND METHODS FOR GENERATING A KNOWLEDGE GRAPH BASED ON INDUSTRIAL DATA

CROSS-REFERENCE TO RELATED APPLICATION

This application claims priority to and the benefit of U.S. patent application Ser. No. 63/479,361, entitled "METHOD AND SYSTEM OF CREATING KNOWLEDGE GRAPH USING INDUSTRIAL DATA", filed Jan. 11, 2023, which is herein incorporated by reference in its entirety for all purposes.

BACKGROUND

This disclosure generally relates to industrial automation systems. More particularly, embodiments of the present disclosure are directed towards generating a knowledge graph based on industrial data.

In industrial automation systems, data collected from one or more data sources may be contextualized to enable the data to be useful for analysis, prediction, and decision-making Contextualization of data in industrial automation systems involves attaching relevant information, such as time, location, operating conditions, equipment status, and so on, to the data. However, effectively contextualizing large amounts of the data from the one or more sources and/or building intelligence or knowledge onto the contextualized data may be challenging. Further, the data received from the one or more data sources may be limited to a type of data, such as machine data. Accordingly, improved techniques for contextualizing data across varying datasets (e.g., varying types of data) and generating a knowledge graph based on the contextualized data are desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In an embodiment, a system includes processing circuitry and a memory, accessible by the processing circuitry, the memory storing instructions that, when executed by the processing circuitry, cause the processing circuitry to perform operations including receiving industrial data collected from an industrial automation system during performance of an industrial automation process and applying an asset model to the industrial data to contextualize the industrial data. When executed, the instructions also cause the processing circuitry to perform operations including determining event data based on the industrial data, generating a knowledge graph based on the industrial data and the event data, identifying an event based on the event data, and providing for display via a graphical user interface (GUI), one or more remedies for the event based on the knowledge graph.

In another embodiment, a non-transitory computer-readable medium includes computer-executable instructions that, when executed, are configured to cause a processing system to perform operations including receiving industrial data collected from an industrial automation system during performance of an industrial automation process, applying an asset model to the industrial data to contextualize the industrial data, determining event data based on the industrial data, and generating a knowledge graph based on the industrial data and the event data. When executed, the instructions also cause the processing system to performing operations including identifying an event based on the event data, determining one or more causes of the event based on the knowledge graph, determining one or more remedies based on the one or more causes, and providing for display via a graphical user interface (GUI) the one or more remedies for the event based on the knowledge graph.

In a further embodiment, a method includes receiving, via a processing system, industrial data collected from an industrial automation system during performance of an industrial automation process, wherein the industrial data comprises human data, machine data, enterprise data, or any combination thereof, applying, via the processing system, an asset model to the industrial data to contextualize the industrial data, and determining, via the processing system, event data based on the industrial data. The method also includes generating, via the processing system, a knowledge graph based on the industrial data and the event data, identifying, via the processing system, one or more events based on the event data, and providing, via a graphical user interface (GUI), one or more remedies for the event based on the knowledge graph.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
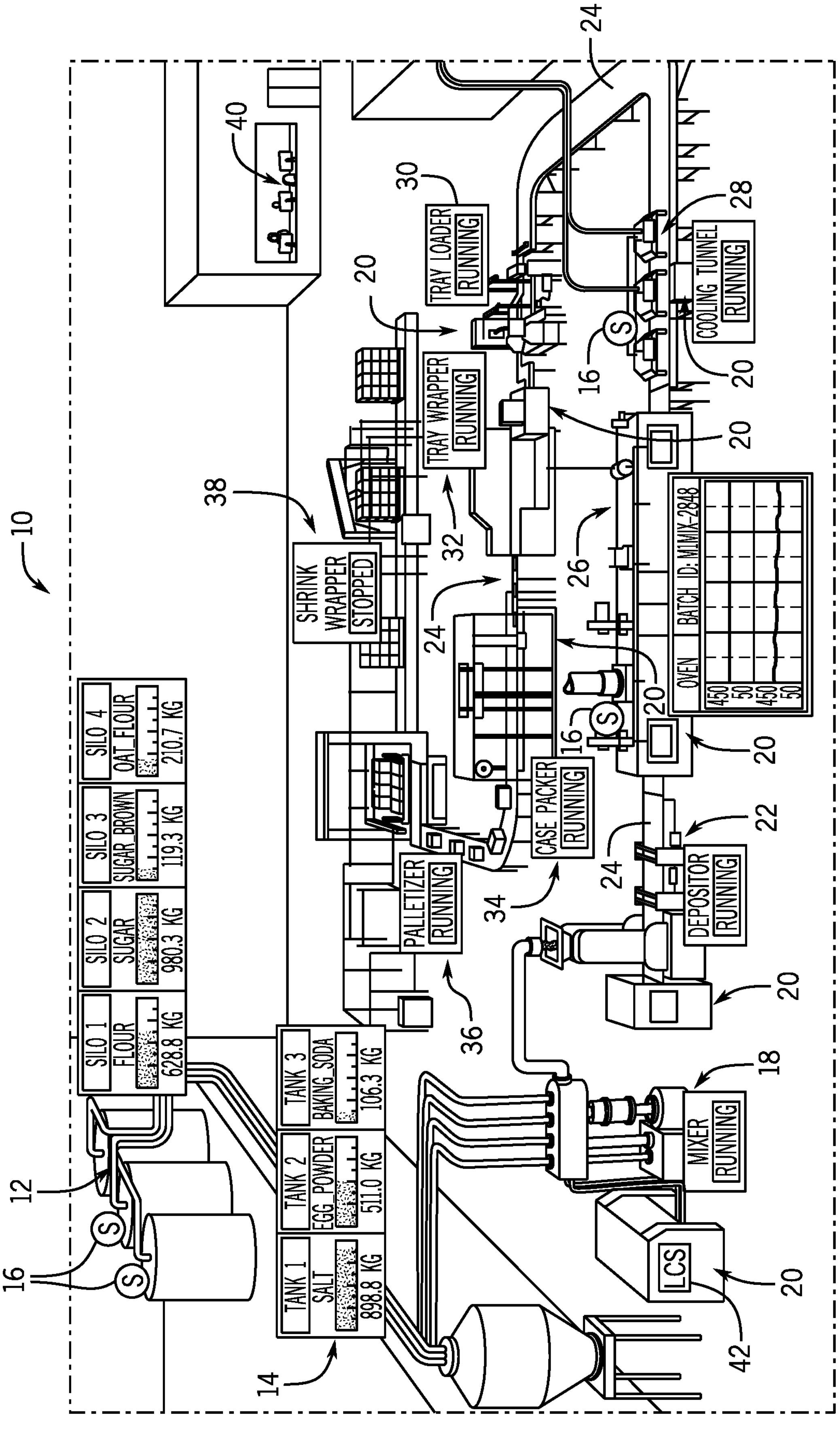
FIG. 1 illustrates an example industrial automation system employed by a food manufacturer, in accordance with embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. As used herein, the terms "modular" and "modular monitor system" may refer to a usually packaged functional assembly of electronic components, and may include standardized units or dimensions for flexibility and variety in use. Additionally, it should be understood that references to "one embodiment" or "an embodiment" of the present disclosure are not intended to be interpreted as excluding the existence of additional embodiments that also incorporate the recited features.

Industrial automation systems are generating vast quantities of data that may be overwhelming to analyze and/or contextualize. Compounding these challenges are difficulties in building intelligence or knowledge onto the contextualized data. Moreover, many existing systems receive a limited type of data, thereby hindering analysis, prediction, and/or decision-making to enable a determination of remedies for events (e.g., deviations) that may occur within the industrial automation system. As such, improved systems and methods for contextualizing data and generating a knowledge graph to enable illustration of relationships and connections between various nodes and edges within the industrial automation system may be desired.

With the foregoing in mind, the present disclosure relates to a unified data system that may generate a knowledge graph (e.g., a semantic network), which may enable identification of events, as well as causes, remedies, symptoms, and/or recommendations for the events within the industrial automation system. The unified data system may receive the industrial data from an industrial automation system. The industrial data may include machine data, human data, and/or enterprise data. For example, the machine data may include data associated with asset parameters, production, deviations, and/or alerts. Further, the human data may include data associated with quality sample parameters. Moreover, the enterprise data may include data associated with asset conditions and/or emissions.

The unified data system may then contextualize the industrial data by applying an asset model to the industrial data. The asset model may provide a representation or an expectation of how an asset operates under typical (e.g., normal, standard, expected) conditions. In some embodiments, the asset model may be based on industry standards. For example, the industry standards may include International Society of Automation (ISA) 88, ISA 95, and/or metadata based on One Data Model (OneDM) Semantic Data Framework. By applying the asset model, the unified data system may uniformly contextualize the industrial data across the varying datasets (e.g., the machine data, the human data, the enterprise data).

Additionally, the unified data system may obtain (e.g., derive) and/or determine event data (e.g., via an event-based data model). The unified data system may determine one or more machine events and/or one or more human events based on the event data. Additionally, the unified data system may derive the events from business rules and/or derive the events from artificial intelligence (AI) models. Indeed, the unified data system may implement the business rules that specify criteria or conditions for triggering each of the events. For example, a business rule may specify a maximum temperature for a reactor, and if the maximum temperature is exceeded, the unified data system may derive the event. Moreover, the AI models may include machine learning models or algorithms that may learn from the industrial data and make predictions based on the industrial data. As an example, the AI model may predict a value of a yield of a process based on the industrial data. Further, the AI model may identify the yield of the process is decreasing below the predicted value of the yield, which indicates a deviation of the process. Thus, the AI model may derive the event based on the deviation.

The unified data system may then generate the knowledge graph based on the industrial data and the event data. The knowledge graph may enable identification of relationships and/or interconnected (e.g., interlinked) data of machinery, processes, and/or operations of the industrial automation system. Further, the knowledge graph may include one or more nodes (e.g., one or more entities) connected by one or more edges (e.g., one or more relationships). The nodes may include any suitable object (e.g., components, machines, equipment), places (e.g., locations), and/or events within the industrial automation system. Moreover, the edges may include one or more causes, one or more symptoms, one or more remedies, one or more recommendations, and/or a feedback loop.

The unified data system may implement machine learning algorithms and/or generative AI (e.g., via one or more large language models (LLMs) to identify the nodes and identify connections (e.g., edges) between the nodes. In some embodiments, an operator (e.g., a user, a customer) may upload one or more manuals (e.g., documents, resources) to the unified data system, such as technical specifications, machine manuals, troubleshooting guides, schematics, and so on. The unified data system may employ generative AI and/or Natural Language Processing (NLP) to parse and extract relevant information (e.g., entities and their relationships) from the uploaded manuals. In this manner, the generative AI may enable inference of one or more events, one or more causes of the one or more events, and/or one or more remedies for the one or more events, as well as other relationships within the industrial automation system.

Additionally, in some embodiments, the unified data system may generate one or more alerts associated with the events and provide the one or more alerts to the operator via a visualization displayed on a display or a user interface (UI). Additional details with regard to implementing improved operations for contextualizing the industrial data and generating the knowledge graph to enable illustration of relationships and connections between various nodes and edges within the industrial automation system will be described below with reference to FIGS. 1-7.

By way of introduction, FIG. 1 illustrates an example industrial automation system 10 employed by a food manufacturer. It should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, reactors, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may receive data regarding the operation of the respective industrial automation device 20, other industrial automation devices 20, user inputs, and other suitable inputs to control the operations of the respective industrial automation device(s) 20.

Figure 2:
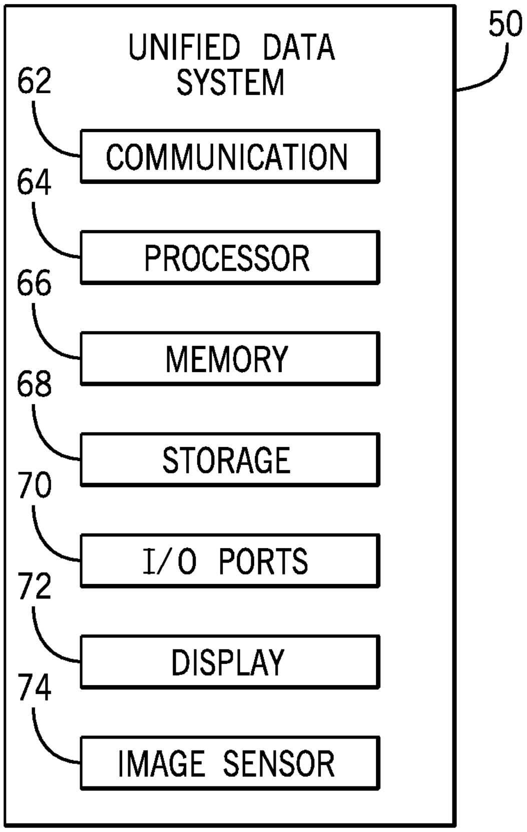
FIG. 2 is a block diagram of example components that may be a part of a unified data system that may be implemented in the industrial automation system of FIG. 1, in accordance with embodiments of the present disclosure.

FIG. 2 illustrates a diagrammatical representation of an exemplary unified data system 50 that may be employed for use in any suitable industrial automation system 10, in accordance with embodiments presented herein. As shown in FIG. 2, the unified data system 50 may include a communication component 62 (e.g., communication circuitry), a processor 64, a memory 66, a storage 68, input/output (I/O) ports 70, a display 72, an image sensor 74, and the like. The communication component 62 may be a wireless or wired communication component that may facilitate communication between the industrial automation devices 20, the local control system 42, and other communication capable devices.

The processor 64 may be any type of computer processor or microprocessor capable of executing computer-executable code. The processor 64 may also include multiple processors or processing circuitry that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques.

The memory 66 and the storage 68 may also be used to store the data, analysis of the data, the software applications, and the like. For example, the memory 66 and the storage 68 may store instructions associated with coordinating operations with other service devices, databases, and the like to perform the techniques described herein. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. The I/O modules may enable the industrial automation devices 20 to communicate with the unified data system 50 or other devices in the industrial automation system 10 via the I/O modules. As such, the I/O modules may include power modules, power monitors, network communication modules, and the like manufactured by the various manufacturers.

The display 72 may depict visualizations associated with software or executable code being processed by the processor 64. In one embodiment, the display 72 may be a touch display capable of receiving inputs (e.g., parameter data for operating the industrial automation equipment) from a user of the industrial automation device 20. As such, the display 72 may serve as a user interface to communicate with control/monitoring device 48. The display 72 may display a graphical user interface (GUI) for operating the respective devices and the like. The display 72 may be any suitable type of display, such as a liquid crystal display (LCD), plasma display, or an organic light emitting diode (OLED) display, for example. Additionally, in one embodiment, the display 72 may be provided in conjunction with a touch-sensitive mechanism (e.g., a touch screen) that may function as part of a control interface for the connected devices. The image sensor 74 may include any image acquisition circuitry such as a digital camera capable of acquiring digital images, digital videos, or the like.

Although the components described above have been discussed with regard to the unified data system 50, it should be noted that similar components may make up other computing devices (e.g., local control system 42) described herein. Further, it should be noted that the listed components are provided as example components and the embodiments described herein are not to be limited to the components described with reference to FIG. 2

Figure 3:
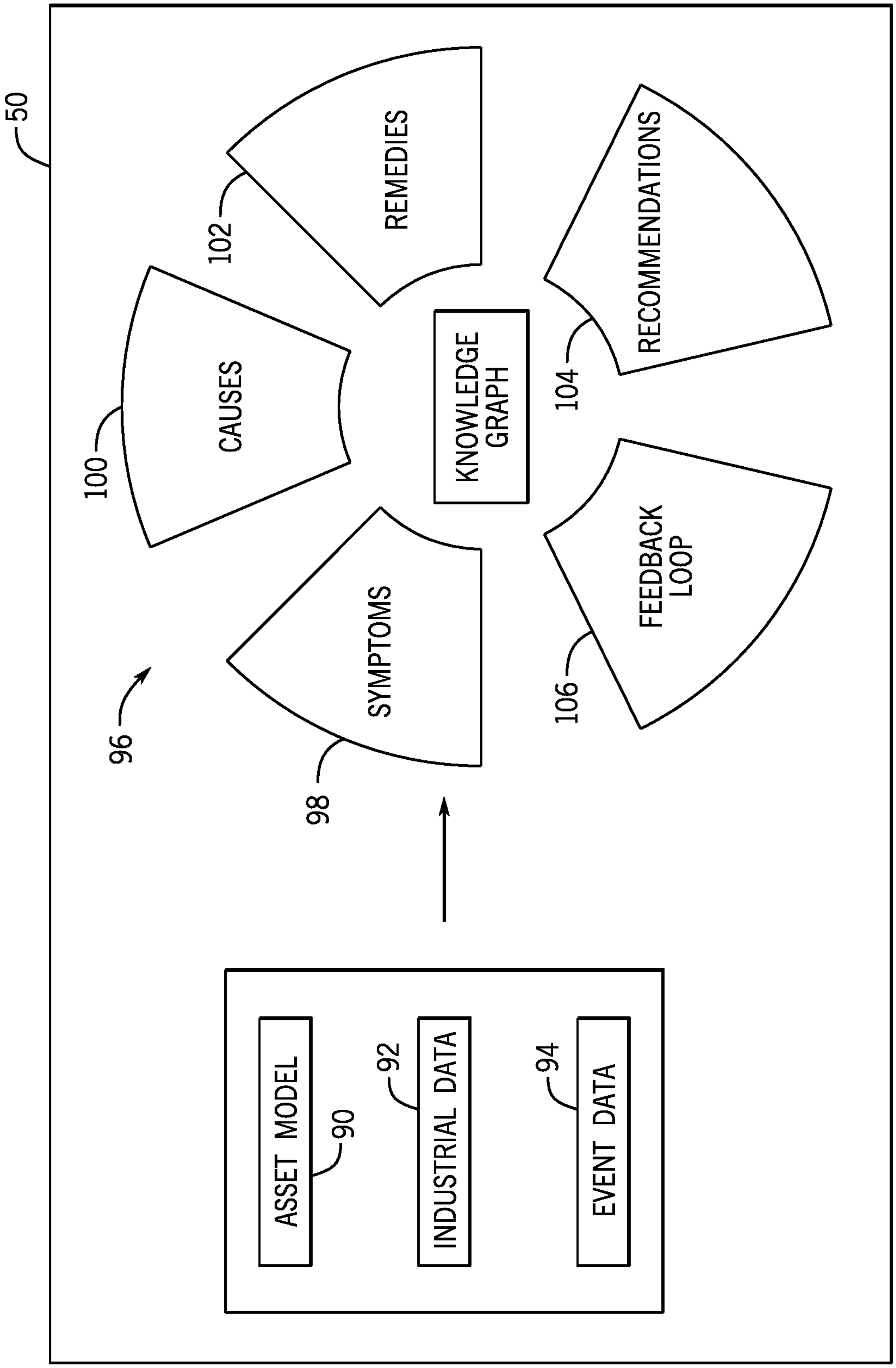
FIG. 3 is an example illustration of an asset model, industrial data, and/or event data employed by the unified data system of FIG. 2 to generate a knowledge graph, in accordance with embodiments of the present disclosure.

Keeping the foregoing in mind, FIG. 3 is an example illustration of an asset model 90, industrial data 92, and/or event data 94 that may be employed by the unified data system 50 to generate a knowledge graph 96, in accordance with embodiments of the present disclosure. The unified data system 50 may receive inputs of the asset model 90, the industrial data 92, and/or the event data 94. The industrial data 92 may include human data, machine data, and/or enterprise data. The human data may include data associated with human involvement in operations, interactions, and/or decision-making processes for the industrial automation system 10. For example, the human data may include quality sample parameters. The machine data may include data generated or collected by the industrial automation devices 20 or any other suitable system or device in the industrial automation system 10, such as machines, equipment, components, devices, and/or sensors. For instance, the machine data may include data associated with asset parameters, production, deviations, and/or alerts. Further, the enterprise data may include data generated and collected by an organization from various processes, machinery, sensors, and system within an environment of the industrial automation system 10. As an example, the enterprise data may include data associated with asset conditions and/or emissions data.

In some embodiments, a portion of or all of the industrial data may be received as time series data. That is, the industrial data may include a sequence of data collected at specific or regular intervals. Additionally or alternatively, a portion of or all of the industrial data may be received as aggregated data. Indeed, the industrial data may include a summarization or a combination of the data over a number of intervals. The time series data and/or the aggregated data may be employed by the unified data system 50 when generating the knowledge graph 96.

The unified data system 50 may apply the asset model 90 to the industrial data 92 to contextualize the data. The asset model 90 may provide a representation or an expectation of how an asset (e.g., the industrial automation devices 20) operates under typical (e.g., normal, standard, expected) conditions. For example, the asset may include equipment, machinery, components, buildings, or any other suitable article included in the industrial automation system 10. Additionally, in some embodiments, the asset model 90 may be based on industry standards. Indeed, the asset model 90 may include a set of criteria (e.g., defined by the industry standards) within an industry relating to standard functioning of the asset and/or carrying out of operations. For instance, the industry standards may include International Society of Automation (ISA) 88, ISA 95, and/or metadata based on One Data Model (OneDM) Semantic Data Framework. In this manner, the asset model 90 defines each of the assets in a standardized (e.g., uniform) way.

By applying the asset model 90 to the industrial data 92, the unified data system 50 may contextualize the industrial data 92 across the varying datasets (e.g., the human data, the machine data, the enterprise data). That is, the unified data system 50 may link (e.g., connect) or associate information about each of the assets in the asset model 90 to corresponding data generated by those assets (e.g., received or obtained from the industrial data 92). By doing so, the unified data system 50 may add context and/or meaning to raw data (e.g., the industrial data 92). Indeed, the unified data system 50 may perform analysis on the industrial data 92 in the context of the assets in the asset model 90 to improve comprehension and/or understanding of the industrial data 92. For example, applying the asset model 90 to the industrial data 92 may enable identification of patterns or deviations (e.g., anomalies), prediction of maintenance demands, optimization of operations, and so on. Thus, the unified data system 50 may improve efficiency in contextualization and comprehension of the varying datasets included in the industrial data 92 via application of the asset model 90.

In some embodiments, the unified data system 50 may access or receive a library (e.g., repository) of various asset models 90. The various asset models 90 may include data gathered (e.g. accrued) from various industries and/or industrial automation systems. Thus, the various asset models 90 may efficiently provide information associated with the assets implemented in the industrial automation system 10. That is, if the industrial data 92 includes data associated with an asset already included in the asset model 90, then application of the asset model 90 to the industrial data 92 may be streamlined. However, if the industrial data 92 includes data associated with an asset not included in the asset model 90, then the operator may input the data associated with the asset to the unified data system 50.

In addition, the unified data system 50 may obtain and/or determine the event data 94 based on the industrial data 92. The event data 94 may include data associated with one or more human events and/or one or more machine events. As an example, the human event may include an action (e.g., a change or adjustment to an automated process or component), input, and/or decision made by the operator, which may trigger the event in the industrial automation system 10. As another example, the machine event may include an action or an occurrence generated or initiated by machines, equipment, and/or components of the industrial automation system 10. In some embodiments, the unified data system 50 may identify the human events and/or the machine events based on the industrial data 92. Indeed, the unified data system 50 may analyze (e.g., process) the industrial data 92 to identify patterns, conditions, and/or triggers that indicate occurrence of the human events and/or the machine events.

The unified data system 50 may also derive (e.g., identify) events from business rules and/or derive events from artificial intelligence (AI) models. The business rules may specify criteria or conditions for triggering (e.g., initiating) each of the events. For instance, a business rule may specify a range of pressure (e.g., in pounds per square inch (psi)) for a reactor, and if the pressure for the reactor is outside of the range of the pressure, the unified data system may derive the event. The AI models may include machine learning models or algorithms that may learn from the industrial data and make predictions based on the industrial data. As an example, the AI model may be employed to identify a standard process the operator implements and identify a deviation in the standard process. The AI model may then be employed to analyze the industrial data to determine the operator changed a set point of the reactor, which caused the event.

The unified data system 50 may then generate the knowledge graph based on the industrial data and the event data. The knowledge graph may enable identification of relationships and/or interconnected (e.g., interlinked) data of equipment, processes, and/or operations of the industrial automation system. Further, the knowledge graph may include one or more nodes (e.g., one or more entities) connected by one or more edges (e.g., one or more relationships). The nodes may include any suitable objects (e.g., components, machines, equipment), places (e.g., locations), and/or events within the industrial automation system. Moreover, the edges may include one or more symptoms 98, one or more causes 100, one or more remedies 102, one or more recommendations 104, and/or a feedback loop 106.

The unified data system 50 may implement machine learning algorithms and/or generative AI to identify the nodes and identify connections of the nodes to the edges. In some embodiments, the operator may upload one or more manuals (e.g., documents, resources) to the unified data system 50, such as technical specifications, machine manuals, troubleshooting guides, schematics, and so on. The one or more manuals uploaded may be specific to components and/or processes employed in the industrial automation system 10 of a particular operator. In this manner, the machine learning algorithms and/or the generative AI may be trained according to the particular operator.

The unified data system 50 may employ generative AI and/or Natural Language Processing (NLP) to parse and extract relevant information (e.g., entities and their relationships) from the uploaded manuals. For example, the node may include a particular event and the generative AI may be applied to determine the symptoms 98 of the event, the causes 100 (e.g., probable causes) of the symptoms 98, the remedies 102 and/or the recommendations 104 associated with each of the causes 100. In this manner, the generative AI and the knowledge graph 96 may enable inference of the events, the symptoms 98, the causes 100, the remedies 102, the recommendations 104, and other relationships within the industrial automation system 10. Additional detail regarding identifying connections (e.g., edges) between the nodes via the knowledge graph 96 will be described below with respect to FIGS. 4-7.

Figure 4:
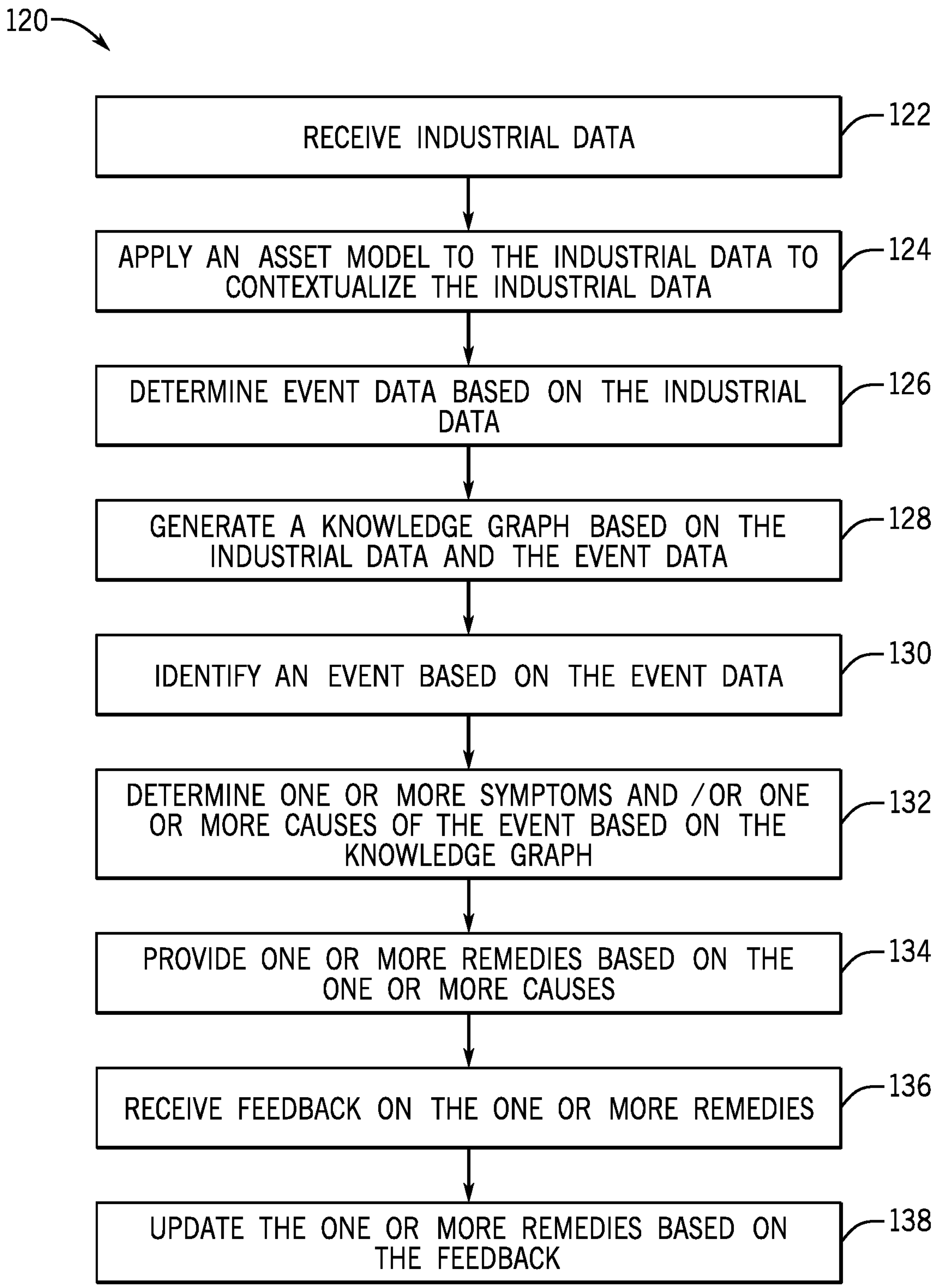
FIG. 4 is a flow chart of a process for providing one or more remedies to an event via the unified data system of FIG. 2, in accordance with embodiments of the present disclosure.

FIG. 4 is a flow chart of a process 120 for providing the remedies 102 to the event via the unified data system 50, in accordance with embodiments of the present disclosure. Although the following description of the process 120 will be discussed as being performed by the unified data system 50, it should be understood that any suitable system (e.g., the supervisory control system 40, the local control system 42) may perform the process 120 in any suitable order.

As described herein, at block 122, the unified data system 50 may receive the industrial data 92, which may include the human data, the machine data, and/or the enterprise data. For example, the unified data system 50 may receive the industrial data 92 from the industrial automation devices 20, the supervisory control system 40, the local control system 42, user inputs, and/or any other suitable inputs, devices, or systems. At block 124, the unified data system 50 may apply the asset model 90 to the industrial data 92 to contextualize the industrial data 92. The asset model 90 may include a template or a library of various assets (e.g., industrial assets) across one or more industrial automation systems 10. Further, the asset model 90 may include prebuild calculations, parameters, Key Performance Indicators (KPI), and/or industrial knowledge based on characteristics of the various assets. The unified data system 50 may connect information of the assets in the asset model 90 to the corresponding data associated with the asset received via the industrial data 92.

Indeed, at initial setup and/or configuration of a particular industrial automation system 10, assets for the industrial automation system 10 may be established based on a physical asset inventory of the industrial automation system 10, which may enable creation of an asset hierarchy. The assets may be derived from the asset model 90. Thus, each asset in the industrial automation system 10 may be linked to a library of the asset model 90, enabling the assets to obtain (e.g., receive, acquire, access) the industrial knowledge defined in the library of the asset model 90. In this manner, the unified data system 50 may obtain the parameters associated with machinery of the industrial automation system 10 by using the calculations defined in the asset model 90.

During data acquisition of the industrial data 92, the unified data system 50 may automatically generate configurations, which may enable mapping of the industrial data 92 to the parameters of the asset model 90. Therefore, as the industrial data 92 is obtained (e.g., from machinery and/or the assets), the unified data system 50 may automatically map the industrial data 92 to the parameters of the asset model 90. In this manner, the unified data system 92 automatically contextualizes the industrial data 92 to the asset model 90. The performance of automatic contextualization by the unified data system 50 may enable an improvement of efficiency of machine processing by eliminating performance of any separate contextualization. Indeed, the unified data system 50 may automatically map the industrial data 92 to the parameters of the asset hierarchy of the asset model 90. Further, the contextualization of the industrial data 92 may enable the unified data system 50 to comprehend (e.g., understand) how different portions (e.g., the varying datasets) of the industrial data 92 relate to each other within a particular data model.

As an example, the industrial data 92 may include an industrial tag representative of data associated with a flow rate of a valve, which is being used to feed raw material to a reaction chamber of a chemical plant. The valve may be included in a first reactor at a first site of a second unit of the chemical plant. Thus, the unified data system 50 may contextualize the industrial data 92 by mapping the industrial data 92 (e.g., the industrial tag) to the asset hierarchy, which may be listed as the chemical plant, the first site, the second unit, and the first reactor. It should be noted that this is one example of contextualizing the industrial data 92 and other methods of contextualization may be employed by the unified data system 50. In other embodiments, the unified data system 50 may contextualize the industrial data 92 to assign contexts, such as a quality context, to identify batches of particularly good quality (e.g., golden batch), or particularly bad quality. Accordingly, the unified data system 50 may be used to contextualize the industrial data 92 by associating the data with various contexts.

At block 126, the unified data system 50 may determine the event data based on the industrial data 92. As previously described, in an embodiment, the unified data system 50 may analyze the industrial data 92 to identify the human events and/or the machine events. In another embodiment, the unified data system 50 may derive the events from the business rules and/or the AI models. At block 128, the unified data system 50 may generate the knowledge graph 96 based on the industrial data 92 and the event data.

The unified data system 50 may generate the knowledge graph 96 by compiling the industrial data 92 and the event data and integrating the industrial data 92 and the event data. In an embodiment, the unified data system 50 may generate the knowledge graph 96 by analyzing time series events and/or patterns provided in the industrial data 92, which may include the time series data. The unified data system 50 may analyze the time series events and/or patterns to determine (e.g., derive) causal relationships between the events. Further, the unified data system 50 may derive the knowledge graph 96 based on the causal relationships. In another embodiment, the unified data system 50 may employ a knowledge extractor on historical data stored in a historical event database and/or on ticket history. Thus, the unified data system 50 may identify the events and the causal relationships between the events and add those to the knowledge graph 96.

In another embodiment, the unified data system 50 may employ the knowledge extractor on one or more original equipment manufacturer (OEM) manuals and identify the events and the causal relationships between those events to generate the knowledge graph 96. In yet another embodiment, unified data system 50 may receive the human data, which includes data associated with an operator of the industrial automation system 10. The human data may indicate when the operator has made at least one change (e.g., update) to the parameters and/or performed at least one operation within the industrial automation system 10 (e.g., a Distributed Control System (DCS), a Supervisory Control and Data Acquisition (SCADA) System). Further, in another embodiment, the unified data system 50 may analyze the enterprise data to determine various dimensions of the enterprise data, such as spares purchases, raw material purchases, energy consumption, and so on. The unified data system 50 may convert the various dimensions of the enterprise data to the events that may trigger the knowledge graph 96. It should be noted that at least one or all of the above embodiments described herein may be employed by the unified data system 50 when generating the knowledge graph 96.

Accordingly, the process of generating the knowledge graph 96 by the unified data system 50 may be a continuous process where additional (e.g., new) methods for discovering knowledge are continuously identified and/or employed by the unified data system 50 to create the knowledge graph 96. A model for generating (e.g., creating) the knowledge graph 96 enables standardization for knowledge extraction from various sources. Further, the unified data system 50 may store the knowledge extracted from the various sources (e.g., in a unified model), which enables continuous scaling of the knowledge graph 96. Accordingly, the process of generating the knowledge graph 96 employed by the unified data system 50 may enable improvements in efficient and/or accurate communication of data to the user. That is, the process may enable an improvement the representation of the data in the knowledge graph 96 by improving interpretation, communication, and/or understanding of the information being conveyed by the unified data system 50. Additionally, the continuous process of generating the knowledge graph 96 may enable continuous real-time analysis of the industrial data 92 and a more efficient identification of trends and/or anomalies in the industrial data 92. Indeed, the continuous process of generating the knowledge graph 96 may result in a more efficient use of, or conservation of computational resources.

After integration, the industrial data 92 and the event data may be represented as various data points. The knowledge graph 96 may be implemented to organize and/or represent the various data points of the industrial data 92 and the event data (e.g., in a machine-readable format). That is, the knowledge graph 96 may enable organization of the industrial data 92 and the event data in a manner that demonstrates (e.g., highlights) relationships (e.g., connections, edges) between the various data points. For example, the knowledge graph 96 may connect the various data points via identification of semantic relationships (e.g., by using NLP to identify meaning of text) and displays the various data points in a graph representation.

After generation of the knowledge graph 96, at block 130, the unified data system 50 may identify (e.g., detect) the event based on the event data. For example, the event may include deviation of a process of the industrial automation system 10, a malfunction in a particular industrial automation device 20, absence of data reception from the particular industrial automation device 20, or any other suitable deviation or anomaly occurring in the industrial automation system 10. At block 132, the unified data system 50 may determine the symptoms 98 and/or the causes 100 of the event based on the knowledge graph 96. As previously discussed, the knowledge graph 96 may be employed to identify connections between the event, the symptoms 98, and/or the causes 100. The unified data system 50 may then provide the remedies 102 based on the causes 100. That is, each of the remedies 102 may be tailored to address the associated cause 100. Additional details and examples with regard to the event, the symptoms 98, the causes 100, and the remedies 102 will be described below with respect to FIGS. 5 and 6.

At process block 136, the unified data system 50 may receive feedback regarding the remedies 102. As described herein, the unified data system 50 may employ the feedback loop 106. Indeed, the feedback loop 106 may be implemented to identify whether the remedies 102 produced a desired outcome. For example, the remedies 102 applied or input in the industrial automation system 10 may not have produced an intended or expected result, or may have been overridden by the operator. As another example, the remedies 102 applied or input in the industrial automation system 10 may have produced the intended or expected result.

In some embodiments, at block 138, the unified data system 50 may receive the feedback and perform an update to the remedies 102. For example, if the remedies 102 did not produce the expected result, the unified data system 50 may perform the update. Additionally or alternatively, the generative AI and/or machine learning algorithms may analyze the feedback to retrain and improve performance. For example, the generative AI and/or machine learning algorithms may identify issues (e.g., incomplete data, unexpected scenarios, incorrect assumptions) that may have led to the undesired outcome and update the algorithms, models, or parameters based on the feedback to retrain and improve performance and accuracy. It should be noted that although the process 120 is described with respect to providing the remedies 102, the unified data system 50 may also provide the recommendations 104 based on the causes. Indeed, in an embodiment, the unified data system 50 may only provide the remedies 102 or the recommendations 104. In another embodiment, the unified data system 50 may provide both the remedies 102 and the recommendations 104.

Figures 5, 6:
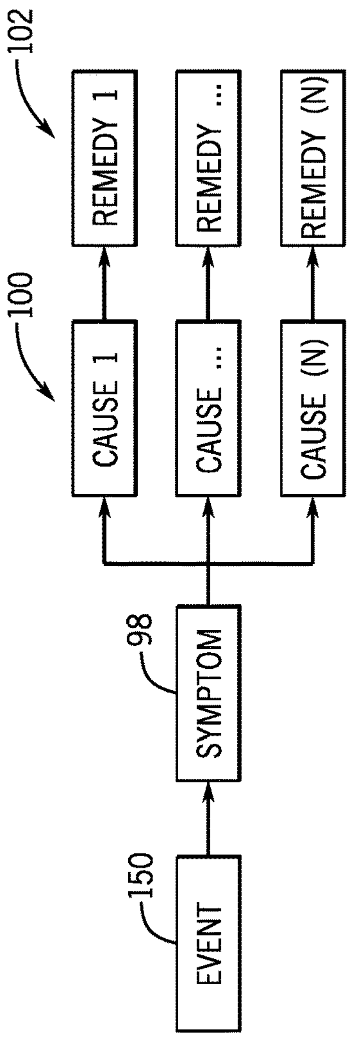
FIG. 5 is a block diagram illustrating analysis of the event to determine the one or more remedies via the unified data system of FIG. 2, in accordance with embodiments of the present disclosure.
FIG. 6 is an example illustration of a visualization of one or more alarms presented to an operator by the unified data system of FIG. 2, in accordance with embodiments of the present disclosure.

With the foregoing in mind, FIG. 5 is a block diagram illustrating analysis of an event 150 to determine the remedies 102 via the unified data system 50, in accordance with embodiments of the present disclosure. As described herein, the unified data system 50 may identify the event 150. For example, the event may indicate that oil pressure of a compressor is low. Based on the knowledge graph 96, the unified data system 50 may identify the symptom 98 associated with the event 150. For instance, the symptom 98 may indicate that the exhaust temperature is low.

The unified data system 50 may then infer a number of causes 100 that are associated with the event 150 and the symptom 98. As an example, a first cause 100 may be that the compressor has malfunctioned, and thus, a first remedy 102 may be resetting a motor shut-down. Moreover, a second cause 100 may be that a temperature sensor has malfunctioned, and thus, a second remedy 102 may be to replace the temperature sensor. Further, a third cause 100 may be that a fan temperature parameter has been modified, and thus, a third remedy 102 may be to reset the fan temperature parameter.

Accordingly, the unified data system 50 may employ the knowledge graph 96 to efficiently identify the events 150 (e.g., deviations and/or anomalies) occurring in the industrial automation system 10. Further, the unified data system 50 may employ the knowledge graph 96 to efficiently identify the symptoms 98, the causes 100, the remedies 102, and/or the recommendations 104 to fix (e.g., solve for) the deviations and/or the anomalies. In this manner, the unified data system 50 may improve efficiency in navigating through extensive varying datasets (e.g., the industrial data, the event data) and analyzing the datasets to fix the deviations and/or the anomalies.

In some embodiments, the unified data system 50 may generate one or more alarms associated with identified events 150. Additionally, the unified data system 50 may present the one or more alerts to the operator of the unified data system 50. In this manner, the operator may be promptly notified of critical or abnormal conditions occurring in the industrial automation system 10, which may enable early detection, improved decision-making, and/or efficient monitoring of the industrial automation system 10.

With the foregoing in mind, FIG. 6 is an example illustration of a visualization 170 (e.g., a graphical user interface (UI)) of one or more alarms 172 (e.g., one or more alerts) presented to the operator by the unified data system 50, in accordance with embodiments of the present disclosure. The unified data system 50 may generate the one or more alarms 172 based on the identified events. Additionally, the unified data system 50 may generate the visualization 170 for presentation to the operator based on the one or more alarms 172. As illustrated, the visualization 170 may include a time stamp 174, a severity level 176, a hierarchy 178, an alarm name 180, an alarm message 182, a status 184, and/or the remedies 102. In some embodiments, the unified data system 50 may generate the visualization 170 based on the analysis of the event 150 to determine the remedies 102, as described above with respect to FIG. 5.

The time stamp 174 may include an indication or a record of an exact (e.g., precise) time at which the event 105 occurred. The severity level 176 may include an indication of a low severity level, a moderate severity level, or a critical severity. Moreover, the hierarchy 178 may include an indication of a representation an entity (e.g., the industrial automation system 10), a particular location in the entity, and a component associated with the particular location. The alarm name 180 may include an indication of a label or identifier for the event identified in the industrial automation system 10. For example, as illustrated in FIG. 6, the alarm name may include the label of low pressure, motor does not start, or low exhaust temperature. Further, the alarm message 182 may include an indication of more descriptive information about the event that triggering the one or more alarms 172. For instance, as illustrated in FIG. 6, the alarm message may include excess pressure, active power (96) <100, or flow meter temperature<20.

Additionally, the status 184 may indicate either an open status or a closed status. The open status may indicate that the event 105 associated with the alarm 172 is ongoing (e.g., unresolved). Thus, in an embodiment, the operator may implement the remedies 102 based on the open status to attempt to resolve the event 105. Additionally or alternatively, the unified data system 50 may provide a prompt to the operator requesting approval to implement the remedies 102. The remedies 102 may then be implemented upon approval provided by the operator. In another embodiment, the remedies 102 may be automatically implemented by any suitable system in the industrial automation system 10, such as the unified data system 50, the supervisory control system 40, or the local control system 42. Further, the closed status may indicate that the event 105 associated with the alarm 172 has been cleared (e.g., resolved). That is, the event 105 that caused the alarm 172 has been addressed. The visualization 170 may also include the remedies 102 associated with each of the alarms 172. Indeed, as shown in FIG. 6, the unified data system 50 may present any suitable number of remedies associated with the event to the operator.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the present embodiments described herein have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
processing circuitry; and
a memory, accessible by the processing circuitry, the memory storing instructions that, when executed by the processing circuitry, cause the processing circuitry to perform operations comprising:
receiving, during performance of an industrial automation process, industrial data generated by an industrial automation device of an industrial automation system;
applying an asset model associated with an expected condition of the industrial automation device to the industrial data to contextualize the industrial data by linking the industrial data to the expected condition of the industrial automation device;
determining event data based on the industrial data;
generating, in real-time, a knowledge graph based on the industrial data and the event data;
identifying an event based on the event data; and
providing for display via a graphical user interface (GUI), one or more remedies for the event based on the knowledge graph.

2. The system of claim 1, wherein the operations comprise determining one or more symptoms, one or more causes, or both, of the event based on the knowledge graph.

3. The system of claim 2, wherein the operations comprise determining the one or more remedies based on the one or more causes.

4. The system of claim 2, wherein the operations comprise providing one or more recommendations based on the one or more causes.

5. The system of claim 1, wherein the industrial data comprises human data, machine data, enterprise data, or any combination thereof.

6. The system of claim 1, wherein the event data comprises one or more human events, one or more machine events, or both.

7. The system of claim 1, wherein the operations comprise identifying the event based on one or more rules, wherein the one or more rules comprise one or more conditions for triggering the event.

8. The system of claim 1, wherein identifying the event is based on an artificial intelligence (AI) model, wherein the AI model comprises a machine learning algorithm.

9. The system of claim 1, wherein the asset model comprises a representation of the expected condition of the industrial automation device in the industrial automation system.

10. The system of claim 1, wherein the operations comprise receiving a library of one or more additional asset models.

11. The system of claim 1, wherein the knowledge graph comprises one or more nodes connected by one or more edges.

12. The system of claim 11, wherein the one or more nodes represent one or more objects, one or more locations, one or more events, or any combination thereof.

13. The system of claim 11, wherein the one or more edges represent one or more symptoms, one or more causes, the one or more remedies, one or more recommendations, a feedback loop, or any combination thereof.

14. The system of claim 1, wherein applying the asset model to the industrial data to contextualize the industrial data is based on a mapping of the industrial data to an asset hierarchy associated with the asset model.

15. A non-transitory computer-readable medium comprising computer-executable instructions that, when executed, are configured to cause a processing system to perform operations comprising:
receiving, during performance of an industrial automation process, industrial data generated by an industrial automation device of an industrial automation system;
applying an asset model associated with an expected condition of the industrial automation device to the industrial data to contextualize the industrial data by linking the industrial data to the expected condition of the industrial automation device;
determining event data based on the industrial data;
generating, in real-time, a knowledge graph based on the industrial data and the event data;
identifying an event based on the event data;
determining one or more causes of the event based on the knowledge graph;
determining one or more remedies based on the one or more causes; and
providing for display via a graphical user interface (GUI) the one or more remedies for the event based on the knowledge graph.

16. The non-transitory computer-readable medium of claim 15, wherein the operations comprise receiving feedback on the one or more remedies.

17. The non-transitory computer-readable medium of claim 16, wherein the operations comprise updating the one or more remedies based on the feedback.

18. A method, comprising:
receiving, via a processing system and during performance of an industrial automation process, industrial data generated by an industrial automation device of an industrial automation system, wherein the industrial data comprises human data, machine data, enterprise data, or any combination thereof;
applying, via the processing system, an asset model associated with an expected condition of the industrial automation device to the industrial data to contextualize the industrial data by linking the industrial data to the expected condition of the industrial automation device;
determining, via the processing system, event data based on the industrial data;
generating, via the processing system and in real-time, a knowledge graph based on the industrial data and the event data;
identifying, via the processing system, one or more events based on the event data; and
providing, via a graphical user interface (GUI), one or more remedies for the one or more events based on the knowledge graph.

19. The method of claim 18, comprising generating, via the processing system, one or more alarms based on the one or more events.

20. The method of claim 19, comprising presenting, via the GUI, a visualization of the one or more alarms to a user.

* * * * *